United States Patent
Bae et al.

(10) Patent No.: US 9,576,179 B2
(45) Date of Patent: Feb. 21, 2017

(54) USER AUTHENTICATION METHOD AND APPARATUS BASED ON FINGERPRINT AND ELECTROCARDIOGRAM (ECG) SIGNAL

(71) Applicant: SAMSUNG ELECTRONICS CO., LTD., Suwon-si (KR)

(72) Inventors: Chisung Bae, Yongin-si (KR); Sangjoon Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 41 days.

(21) Appl. No.: 14/666,522

(22) Filed: Mar. 24, 2015

(65) Prior Publication Data
US 2016/0042219 A1    Feb. 11, 2016

(30) Foreign Application Priority Data

Aug. 7, 2014 (KR) ........................ 10-2014-0101660

(51) Int. Cl.
   *G06K 9/62* (2006.01)
   *G06K 9/00* (2006.01)

(52) U.S. Cl.
   CPC ......... *G06K 9/0008* (2013.01); *G06K 9/00006* (2013.01); *G06K 9/00013* (2013.01);
   (Continued)

(58) Field of Classification Search
   None
   See application file for complete search history.

(56) References Cited

U.S. PATENT DOCUMENTS

| 5,559,504 A | 9/1996 | Itsumi et al. |
| 6,026,321 A | 2/2000 | Miyata et al. |

(Continued)

FOREIGN PATENT DOCUMENTS

| JP | 2008-77269 A | 4/2008 |
| KR | 10-2006-0038119 A | 5/2006 |

(Continued)

OTHER PUBLICATIONS

Li, S. et al., "Encyclopedia of Biometrics, Passage," Encyclopedia of Biometrics; [Springer Reference], Document No. XP002584312, Jan. 1, 2009 (24 pages).

(Continued)

*Primary Examiner* — Brian P Werner
(74) *Attorney, Agent, or Firm* — NSIP Law

(57) ABSTRACT

An authentication apparatus includes a biometric data acquirer configured to acquire fingerprint data and an electrocardiogram (ECG) waveform of a user, and a humidity level acquirer configured to acquire a humidity level of skin of the user. The apparatus further includes a similarity extractor configured to adjust a first similarity between the fingerprint data and reference fingerprint data of a pre-registered user, and a second similarity between the ECG waveform and a reference ECG waveform of the pre-registered user, based on the humidity level, and extract a combined similarity based on the adjusted first similarity and the adjusted second similarity. The apparatus further includes an authenticator configured to authenticate whether the user is the pre-registered user based on the combined similarity.

26 Claims, 10 Drawing Sheets

(52) U.S. Cl.
CPC ..... *G06K 9/00087* (2013.01); *G06K 9/00892* (2013.01); *G06K 9/6289* (2013.01); *G06K 2009/00939* (2013.01)

(56) References Cited

U.S. PATENT DOCUMENTS

| | | | |
|---|---|---|---|
| 7,171,680 | B2 | 1/2007 | Lange |
| 7,362,884 | B2* | 4/2008 | Willis ................ G06K 9/00892 340/5.82 |
| 8,598,980 | B2 | 12/2013 | Evans et al. |
| 2001/0033220 | A1* | 10/2001 | Stone ................... A61B 5/1172 340/5.52 |
| 2005/0240778 | A1 | 10/2005 | Saito |
| 2007/0003110 | A1* | 1/2007 | Gutta ................. G06K 9/00006 382/115 |
| 2008/0223925 | A1 | 9/2008 | Saito et al. |
| 2010/0045705 | A1 | 2/2010 | Vertegaal et al. |

FOREIGN PATENT DOCUMENTS

| | | |
|---|---|---|
| KR | 10-2011-0002373 A | 1/2011 |
| KR | 10-1030311 B1 | 5/2011 |
| KR | 10-1203669 B1 | 11/2012 |
| KR | 10-2013-0055729 A | 5/2013 |
| KR | 10-1270954 B1 | 6/2013 |
| WO | WO 2012/151680 A1 | 11/2012 |

OTHER PUBLICATIONS

Extended European Search Report issued on Jan. 21, 2016 in counterpart European Application 15179682.8 (6 pages).

Sufi, F. et al., "ECG-Based Authentication," Handbook of Information and Communication Security, Springer Berlin Heidelberg, 2010 (pp. 309-331).

* cited by examiner

| Humidity level | 0 | 10 | ... | 90 | 100 |
|---|---|---|---|---|---|
| $T_F$ | 85 | 80 | ... | 15 | 10 |
| $T_E$ | 10 | 15 | ... | 80 | 85 |
| α | 1 | 09 | ... | 0.1 | 0 |
| β | 0 | 0.1 | ... | 0.9 | 1 |

- 420 → $T_F$
- 430 → $T_E$
- 440 → α
- 450 → β

USER AUTHENTICATION METHOD AND APPARATUS BASED ON FINGERPRINT AND ELECTROCARDIOGRAM (ECG) SIGNAL

CROSS-REFERENCE TO RELATED APPLICATION

This application claims the benefit under 35 USC 119(a) of Korean Patent Application No. 10-2014-0101660, filed on Aug. 7, 2014, in the Korean Intellectual Property Office, the entire disclosure of which is incorporated herein by reference for all purposes.

BACKGROUND

1. Field

The following description relates to a user authentication method and a user authentication apparatus based on a fingerprint and an electrocardiogram (ECG) signal.

2. Description of Related Art

Technology for applying signals and data extracted from a body, to various systems is developing. For example, biometric technology for establishing a security system based on a biosignal and biometric data is drawing attention. The biometric technology may refer to technology for extracting a signal or data associated with a body of a user and comparing a result of the extracting to pre-stored data, thereby authenticating the user as a registered user through identification. As an example, technology for recognizing a user based on a personal electrocardiogram (ECG) signal is under development in a biometric technology field.

The biometric technology may use a unique biosignal of each user. Since the unique biosignal may not be stolen or lost and have robustness against forgery or falsification, the biometric technology is highly favored in a security field. Research has been conducted to improve a unique biosignal recognition rate.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an authentication apparatus including a biometric data acquirer configured to acquire fingerprint data and an electrocardiogram (ECG) waveform of a user, and a humidity level acquirer configured to acquire a humidity level of skin of the user. The apparatus further includes a similarity extractor configured to adjust a first similarity between the fingerprint data and reference fingerprint data of a pre-registered user, and a second similarity between the ECG waveform and a reference ECG waveform of the pre-registered user, based on the humidity level, and extract a combined similarity based on the adjusted first similarity and the adjusted second similarity. The apparatus further includes an authenticator configured to authenticate whether the user is the pre-registered user based on the combined similarity.

The fingerprint data, the ECG waveform, and the humidity level may be acquired from an identical finger of the user.

The biometric data acquirer may include a fingerprint feature point extractor configured to sense the fingerprint data, using a fingerprint sensor, and extract fingerprint feature points from the fingerprint data, and an ECG feature point extractor configured to sense the ECG waveform, using an ECG sensor, and extract ECG feature points from the ECG waveform.

The ECG sensor may include electrodes configured to acquire an ECG signal of the user, an amplifier configured to amplify the ECG signal, and a digital converter configured to convert the amplified ECG signal to the ECG waveform.

The similarity extractor may be configured to extract the combined similarity based on a difference value between the first similarity and a first threshold determined based on the humidity level, and a difference value between the second similarity and a second threshold determined based on the humidity level.

The similarity extractor may be configured to extract the first threshold and the second threshold from predetermined data.

The similarity extractor may be configured to extract the first threshold based on a difference in a number of fingerprint feature points corresponding to each of items of pre-stored fingerprint data based on the humidity level, or a difference in a distance separating the fingerprint feature points corresponding to each of the items of the pre-stored fingerprint data.

The similarity extractor may be configured to calculate a signal-to-noise ratio (SNR) of each of pre-stored ECG signals based on the humidity level, and extract the second threshold based on the SNR.

The similarity extractor may be configured to extract the combined similarity by applying a first weighted value determined based on the humidity level to the difference value between the first similarity and the first threshold, and applying a second weighted value determined based on the humidity level to the difference value between the second similarity and the second threshold.

The similarity extractor may be configured to extract the combined similarity by adding the difference value to which the first weighted value is applied, to the difference value to which the second weighted value is applied.

The similarity extractor may be configured to set the first weighted value and the second weighted value such that the first weighted value has a negative relationship with the humidity level, the second weighted value has a positive relationship with the humidity level, and a sum of the first weighted value and the second weighted value is constant irrespective of the humidity level.

The fingerprint feature points may include at least two of a ridge, an upper center point, a lower center point, a left delta, a right delta, a bifurcation, and an ending point of the fingerprint data.

The ECG feature points may include at least two of a PR segment, a QRX complex, an ST segment, a T wave, a U wave, a PR interval, and a QT interval of the ECG waveform.

The authenticator may be configured to authenticate the user as the pre-registered user in response to the combined similarity being greater than a predetermined value.

In another general aspect, there is provided an authentication apparatus including a fingerprint sensor configured to sense fingerprint data of a user, and an electrocardiogram (ECG) sensor configured to sense an ECG waveform of the user based on a first electrode, a second electrode, and a third electrode. The apparatus further includes a humidity sensor configured to sense a humidity level of skin of the user, and a processor configured to adjust, based on the humidity level, a first similarity between the fingerprint data and reference fingerprint data of a pre-registered user, and a second similarity between the ECG waveform and a reference ECG waveform of the pre-registered user, extract a combined similarity based on the adjusted first similarity and the adjusted second similarity, and authenticate whether the user is the pre-registered user based on the combined similarity.

The first electrode, the fingerprint sensor, and the humidity sensor may be disposed in a predetermined area.

The first electrode, the fingerprint sensor, and the humidity sensor may be configured to sense an identical finger of the user.

The processor may be configured to extract the combined similarity based on a difference value between the first similarity and a first threshold determined based on the humidity level, and a difference value between the second similarity and a second threshold determined based on the humidity level.

The processor may be configured to extract the combined similarity by applying a first weighted value determined based on the humidity level to the difference value between the first similarity and the first threshold, and applying a second weighted value determined based on the humidity level to the difference value between the second similarity and the second threshold.

The processor may be configured to extract the combined similarity by adding the difference value to which the first weighted value is applied, to the difference value to which the second weighted value is applied.

In still another general aspect, there is provided an authentication apparatus including a biometric data acquirer configured to acquire first biometric data and second biometric data of the user, and a humidity level acquirer configured to acquire a humidity level of skin of the user. The apparatus further includes a similarity extractor configured to adjust, based on the humidity level, a first similarity between the first biometric data and respective first reference biometric data of a pre-registered user, and a second similarity between the second biometric data and respective second reference biometric data of the pre-registered user, and extract a combined similarity based on the adjusted first similarity and the adjusted second similarity. The apparatus further includes an authenticator configured to authenticate whether the user is the pre-registered user based on the combined similarity.

In yet another general aspect, there is provided an authentication method including acquiring fingerprint data and an electrocardiogram (ECG) waveform of a user, and acquiring a humidity level of skin of the user. The method further includes adjusting a first similarity between the fingerprint data and reference fingerprint data of a pre-registered user, and a second similarity between the ECG waveform and a reference ECG waveform of the pre-registered user, based on the humidity level, and extracting a combined similarity based on the adjusted first similarity and the adjusted second similarity. The method further includes authenticating whether the user is the pre-registered user based on the combined similarity.

In still another general aspect, there is provided an authentication method including acquiring first biometric data and second biometric data of a user, and acquiring a humidity level of skin of the user. The method further includes adjusting, based on the humidity level, a first similarity between the first biometric data and respective first reference biometric data of a pre-registered user, and a second similarity between the second biometric data and respective second reference biometric data of the pre-registered user, and extracting a combined similarity based on the adjusted first similarity and the adjusted second similarity. The method further includes authenticating whether the user is the pre-registered user based on the combined similarity.

In yet another general aspect, there is provided an authentication apparatus including a processor configured to adjust, based on a humidity level of skin of a user, a first similarity between first biometric data of the user and first reference biometric data of a pre-registered user, and a second similarity between second biometric data of the user and second reference biometric data of the pre-registered user, and extract a combined similarity based on the adjusted first similarity and the adjusted second similarity, and authenticate whether the user is the pre-registered user based on the combined similarity.

The processor may be configured to increase the first similarity, and decrease the second similarity, in response to the humidity level increasing, and decrease the first similarity, and increase the second similarity, in response to the humidity level decreasing.

A quality of the first biometric data may decrease in response to the humidity level increasing, and a quality of the second biometric data may increase in response to the humidity level increasing.

Other features and aspects will be apparent from the following detailed description, the drawings, and the claims.

BRIEF DESCRIPTION OF THE DRAWINGS

FIG. 4 is a diagram illustrating an example of a lookup table including data based on a humidity level.

Figure 1:
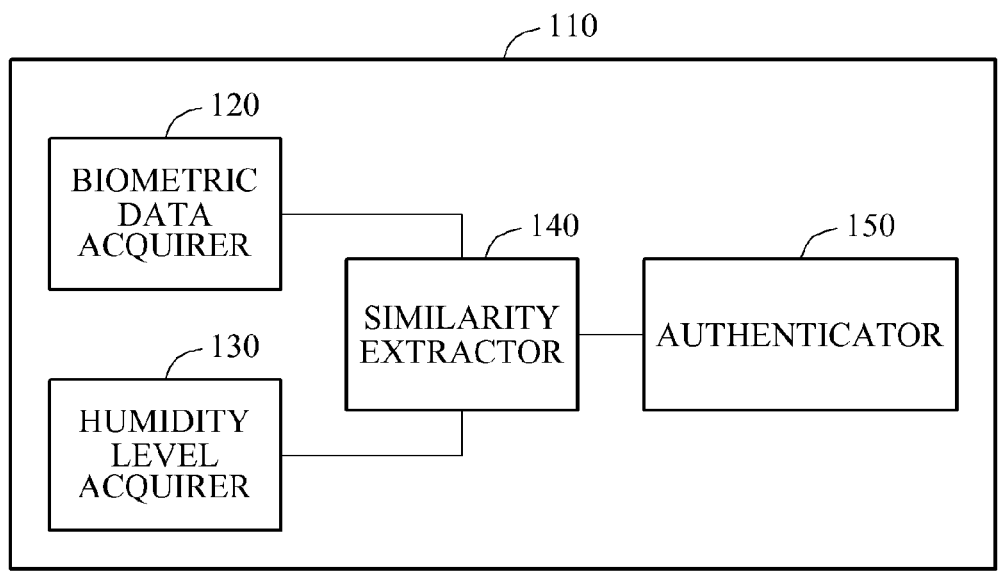
FIG. 1 is a block diagram illustrating an example of an authentication apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 is a block diagram illustrating an example of an authentication apparatus 110. Referring to FIG. 1, the authentication apparatus 110 includes a biometric data acquirer 120, a humidity level acquirer 130, a similarity extractor 140, and an authenticator 150.

The biometric data acquirer 120 acquires a plurality of items of biometric data on a user. The authentication apparatus 110 determines whether the user is allowed to access a device including the authentication apparatus 110, based on the plurality of items of biometric data acquired by the biometric data acquirer 120. Since the authentication apparatus 110 authenticates the user based on the plurality of items of biometric data in lieu of a single item of the biometric data, a security of the authentication apparatus 110 may be improved.

In an example, the biometric data acquirer 120 may receive, for example, electrocardiogram (ECG) data, electromyography (EMG) data, iris data, blood vessel data, vein data, voice data, face data, and/or palm line data of the user from a corresponding sensor. In an example, the biometric data acquirer 120 may acquire a plurality of items of biometric data affected by a humidity level, such as fingerprint data, ECG data, EMG data and palm line data. Hereinafter, descriptions with respect to the authentication apparatus 110 will be provided based on fingerprint data and ECG data among the plurality of items of biometric data for increased clarity and conciseness. However, biometric data used by the authentication apparatus 100 is not limited to the fingerprint data and the ECG data.

The biometric data acquirer 120 may include a fingerprint feature value extractor (not shown) and an ECG feature point extractor (not shown). The fingerprint feature point extractor may sense the fingerprint data, using a fingerprint sensor. The fingerprint sensor may include, for example, an optical sensor, a semiconductor device-based sensor, an ultrasonic sensor, a heat detection-based sensor, a non-contact sensor, and/or a multiple-way sensor. The fingerprint feature point extractor may extract a plurality of fingerprint feature points of the fingerprint data. In this example, the plurality of fingerprint feature points may include at least two of a ridge, an upper center point, a lower center point, a left delta, a right delta, a bifurcation, and an ending point of a fingerprint. The fingerprint feature point extractor may increase a contrast between light and shaded portions of the fingerprint data received from the fingerprint sensor, and remove noise from the fingerprint data. For example, the fingerprint feature point extractor may extract a directional component for each ridge from the fingerprint data, perform binary-coding on the ridge and a valley separate from one another, and verify a thickness of the ridge, thereby thinning the fingerprint data to lines. Also, in an example, the fingerprint feature point extractor may extract the ridge from the thinned fingerprint data, and extract the upper center point, the lower center point, the left delta, the right delta, a distance between bifurcations, a distance between ending points, and/or a number of bifurcations and ending points.

The ECG feature point extractor may extract an ECG waveform, using an ECG sensor. The ECG sensor may include a plurality of electrodes, an amplifier, and a digital converter. The plurality of electrodes may be in contact with skin, for example, a finger of the user, and used to sense an ECG signal of the user. The amplifier may amplify the ECG signal sensed in the plurality of electrodes. In an example, the amplifier may be expressed as an analog front-end (AFE). The digital converter may convert the amplified ECG signal into a digital signal to extract the ECG waveform. Through this, a signal-to-noise ratio (SNR) of the ECG signal may be improved. Also, the ECG feature point extractor may extract a plurality of ECG feature points from the ECG waveform received from the ECG sensor. In this example, the plurality of ECG feature points may include at least two of a PR segment, a QRS complex, an ST segment, a T wave, a U wave, a PR interval, and a QT interval of the ECG waveform.

The humidity level acquirer 130 acquires a humidity level of the user, using a humidity sensor. The humidity sensor may sense an amount of water evaporating from the skin of the user and convert a result of the sensing into the humidity level. For example, the humidity sensor may extract the humidity level based on a change in a capacitance or an electric resistance occurring when water on the skin is absorbed into porous ceramics or polymer membranes. The humidity sensor may include any sensor for sensing the humidity level of the skin. In an example, the humidity sensor may be disposed adjacent to the fingerprint sensor and the ECG sensor. In this example, the humidity sensor, the fingerprint sensor, and the ECG sensor may acquire corresponding data from an identical finger of the user.

The similarity extractor 140 may extract a combined similarity by adaptively adjusting a first similarity and a second similarity based on the humidity level. In this example, the first similarity may refer to a similarity between reference fingerprint data and the fingerprint data acquired in the biometric data acquirer 120, and the second similarity may refer to a similarity between a reference ECG waveform and the ECG waveform acquired in the biometric data acquirer 120. The reference fingerprint data and the reference ECG waveform may indicate fingerprint data and an ECG waveform, respectively, of the user registered in advance in the authentication apparatus 110. The combined similarity, the first similarity, and the second similarity may be, for example, percentage or score values. In this example, the combined similarity may indicate whether a user attempting to be authenticated matches a pre-registered user corresponding to the reference fingerprint data and the reference ECG waveform.

In an example, the authentication apparatus 110 may acquire fingerprint data and an ECG waveform of the user attempting to be authenticated, and store the acquired fingerprint data and ECG waveform in advance. Also, the authentication apparatus 110 may receive the reference fingerprint data and the reference ECG waveform of the pre-registered user from an external source.

The similarity extractor 140 may extract the first similarity by determining whether a plurality of fingerprint feature points in the fingerprint data acquired by the biometric data acquirer 120 matches a plurality of fingerprint feature points in the reference fingerprint data. In an example, the similarity extractor 140 may determine the first similarity based on, for example, a simple pattern matching scheme, a statistical identification scheme, and/or a structural identification scheme. In this example, the simple pattern matching scheme may refer to a method of determining a similarity by verifying whether an extraction pattern for the plurality of fingerprint feature points in the reference fingerprint data is identical to an extraction pattern for the plurality of fingerprint feature points included in the fingerprint data acquired by the biometric data acquirer 120. The statistical identification method may refer to a method of determining a similarity by calculating a concurrent generation probability between a feature vector of the reference fingerprint data and a feature vector of the fingerprint data acquired in the biometric data acquirer 120 when a direct combination between two fingerprint feature points to be combined is not possible. The structural identification scheme may refer to a method of extracting a similarity from a graph obtained by structurally analyzing the plurality of fingerprint feature points of the reference fingerprint data and the plurality of fingerprint feature points of the fingerprint data acquired in the biometric data acquirer 120.

Also, the similarity extractor 140 may extract the second similarity based on distances between the plurality of ECG feature points of the ECG waveform acquired in the biometric data acquirer 120 and the plurality of ECG feature points of the reference ECG waveform. In an example, the similarity extractor 140 may extract the second similarity based on at least one of a cosine similarity, a root-mean-square error (RMSE), a correlation coefficient, a P-norm, an L1 norm, and a Euclidean norm among the plurality of ECG feature points of the reference ECG waveform corresponding to each of the plurality of ECG feature points in the ECG waveform acquired by the biometric data acquirer 120. The first similarity and the second similarity may increase according to an increase in a similarity between the reference fingerprint data and the fingerprint data acquired in the biometric data acquirer 120 and an increase in a similarity between the reference ECG waveform and the ECG waveform acquired in the biometric data acquirer 120, respectively.

Qualities of the fingerprint data and the ECG waveform acquired by the biometric data acquirer 120 may vary based on the humidity level. In an example of the fingerprint data, when water exists on a finger in contact with the fingerprint sensor, the fingerprint sensor may inaccurately recognize fingerprint feature points of fingerprint data due to water existing on the finger. For example, water existing on the finger may cause a decrease in a skin impedance of the finger being in contact with the fingerprint sensor, and thus, the fingerprint sensor may inaccurately recognize a fingerprint. Accordingly, the biometric data acquirer 120 may acquire low quality fingerprint data when the humidity level of the finger is relatively high, and the biometric data acquirer 120 may acquire high quality fingerprint data when the humidity level of the finger is relatively low.

In an example of the ECG waveform, when water exists on skin in contact with the ECG sensor, a flow of microcurrent between the skin and an electrode of the ECG sensor may be improved, and thus, a quality of an ECG signal sensed by the ECG sensor may also increase. Accordingly, the biometric data acquirer 120 may acquire a high quality ECG waveform when the humidity level of the finger is relatively high, and the biometric data acquirer 120 may acquire a low quality ECG waveform when the humidity level of the finger is relatively low.

As described above, the similarity extractor 140 may extract a combined similarity by adaptively adjusting the first similarity and the second similarity in consideration of characteristics of the qualities of the fingerprint data and the ECG waveform varying based on the humidity level. In an example, the similarity extractor 140 may extract the combined similarity by applying a first threshold and a second threshold determined based on the humidity level, to the first similarity and the second similarity. Also, in an example, the similarity extractor 140 may extract the combined similarity by applying a first weighted value and a second weighted value as well as the first threshold and the second threshold, to the first similarity and the second similarity. For example, the similarity extractor 140 may extract the combined similarity by using Equation 1.

$$S_C = \alpha \cdot r(S_F - T_F) + \beta \cdot r(S_E - T_E) \quad \text{[Equation 1]}$$

In Equation 1, $S_C$ denotes the combined similarity, $\alpha$ denotes the first weighted value, $\beta$ denotes the second weighted value, $S_F$ denotes the first similarity, $S_E$ denotes the second similarity, $T_F$ denotes the first threshold, $T_E$ denotes the second threshold, and $r(\bullet)$ denotes a ramp function. The similarity extractor 140 may apply the first weighted value to a difference value between the first similarity and the second similarity, and apply the second weighted value to a difference value between the second similarity and the second threshold. In this example, based on the ramp function $r(\bullet)$, when the first similarity is less than or equal to the first threshold, the difference value between the first similarity and the first threshold may be 0, and when the second similarity is less than or equal to the second threshold, the difference value between the second similarity and the second threshold may be 0. Also, the similarity extractor 140 may extract the combined similarity by adding the difference value to which the first weighted value is applied, to the difference value to which the second weighted value is applied.

In an example, the similarity extractor 140 may extract the first threshold and the second threshold from predetermined reference data. For example, the similarity extractor 140 may include a lookup table storing data of the first threshold, the second threshold, the first weighted value, and the second weighted value, based on the humidity level. In this example, the similarity extractor 140 may calculate the data of the first threshold, the second threshold, the first weighted value, and the second weighted value, based on the humidity level in advance, to be stored in the lookup table. Alternatively, the similarity extractor 140 may receive the lookup table or an entry value, for example, the first threshold, the second threshold, the first weighted value, and the second weighted value, based on the humidity level, of the lookup table from an external source by using a communication interface. The similarity extractor 140 may set the first threshold, the second threshold, the first weighted value, and the second weighted value, based on the lookup table or the entry value of the lookup table.

In an example, the similarity extractor 140 may extract the first threshold, by using a difference in a number of a plurality of fingerprint feature points corresponding to each item of pre-stored fingerprint data, among a plurality of items of pre-stored fingerprint data based on the humidity level, or by using a difference in a distance separating the plurality of fingerprint points corresponding to each item of pre-stored fingerprint data, among the plurality of items of pre-stored fingerprint data based on the humidity level. The number of the fingerprint feature points and the distance separating the fingerprint feature points of the fingerprint data may vary based on the humidity level. For example, the number of the fingerprint feature points acquired at a higher humidity level may be greater than the number of fingerprint feature points acquired at a lower humidity level. Also, the distance separating the fingerprint feature points acquired at the higher humidity level may be greater than the distance separating the fingerprint feature points acquired at the lower humidity level. The similarity extractor 140 may acquire data of the difference in the number of the fingerprint feature points based on the humidity level and the difference in the distance separating the fingerprint feature points based on the humidity level, for each item of the fingerprint data in advance. By statistically analyzing the acquired data, a minimum value from which the first similarity obtains reliability may be calculated based on the humidity level, and the minimum value may be set as the first threshold. In detail, the minimum value indicates a minimum value of the difference in the number of a plurality of fingerprint feature points or the difference in a distance separating the plurality of fingerprint feature points. From the minimum value corresponding to the difference in the number or the difference in the distance, the first similarity starts to obtain a reliability based on the humidity level.

Also, the similarity extractor 140 may calculate an SNR for each of the plurality of ECG signals varying based on the humidity level, and extract the second threshold based on the SNR. The similarity extractor 140 may determine an intensity of a plurality of pre-stored ECG signals based on the humidity level. The similarity extractor 140 may store a noise value of the plurality of pre-stored ECG signals varying based on the humidity level in advance. The similarity extractor 140 may determine the SNR for each of the plurality of ECG signals varying based on the humidity level by using the stored noise value and the operated SNR. For example, an intensity of the plurality of ECG signals acquired at a high humidity level may be greater than an intensity of the plurality of ECG signals acquired at a low humidity level. Thus, an SNR of the plurality of ECG signals that is determined at the high humidity level may be greater than an SNR of the plurality of ECG signals that is determined at the low humidity level. The similarity extractor 140 may calculate a minimum value from which the second similarity obtains reliability based on the humidity level by statistically analyzing the SNR for each of the plurality of ECG signals varying based on the humidity level, and may set the calculated minimum value as the second threshold. In detail, the minimum value indicates a minimum value of the SNR of the ECG signals. From the minimum value corresponding to the SNR, the second similarity starts to obtain a reliability based on the humidity level.

In an example, the similarity extractor 140 may set the first weighted value and the second weighted value such that the first weighted value has a negative relationship with the humidity level and the second weighted value has a positive relationship with the humidity level. The setting may be performed based on characteristics of a fingerprint data quality decreasing according to an increase in the humidity level and an ECG waveform quality increasing according to the increase in the humidity level. Thus, the similarity extractor 140 may more highly reflect the first similarity in the combined similarity than the second similarity, according to an increase in the fingerprint data quality. Also, the similarity extractor 140 may more highly reflect the second similarity in the combined similarity than the first similarity, according to an increase in the ECG waveform quality. The similarity extractor 140 may set the first weighted value and the second weighted value such that a sum of the first weighted value and the second weighted value is maintained to be constant irrespective of the humidity level. For example, the similarity extractor 140 may set the first weighted value and the second weighted value such that the sum of the first weighted value and the second weighted value is 1.

The authenticator 150 authenticates whether the user is the pre-registered user based on the combined similarity. The authenticator 150 may authenticate the user as the pre-registered user when the combined similarity is greater than a predetermined combined threshold, and authenticate the user as an unregistered user when the combined similarity is less than or equal to the predetermined combined threshold. In an example, the authenticator 150 may arbitrarily set the combined threshold or set the combined threshold under a control of an external device.

When the user is authenticated as the pre-registered user, the authentication apparatus 110 may assign an authority to the user to access the device including the authentication apparatus 110. When the user is authenticated as the unregistered user, the user may be disallowed to access the device including the authentication apparatus 110. By performing an authentication on the user based on the combined similarity, the authentication apparatus 110 may robustly and accurately authenticate whether the user is the pre-registered user despite the change in the humidity level of the skin of the user.

Figure 2:
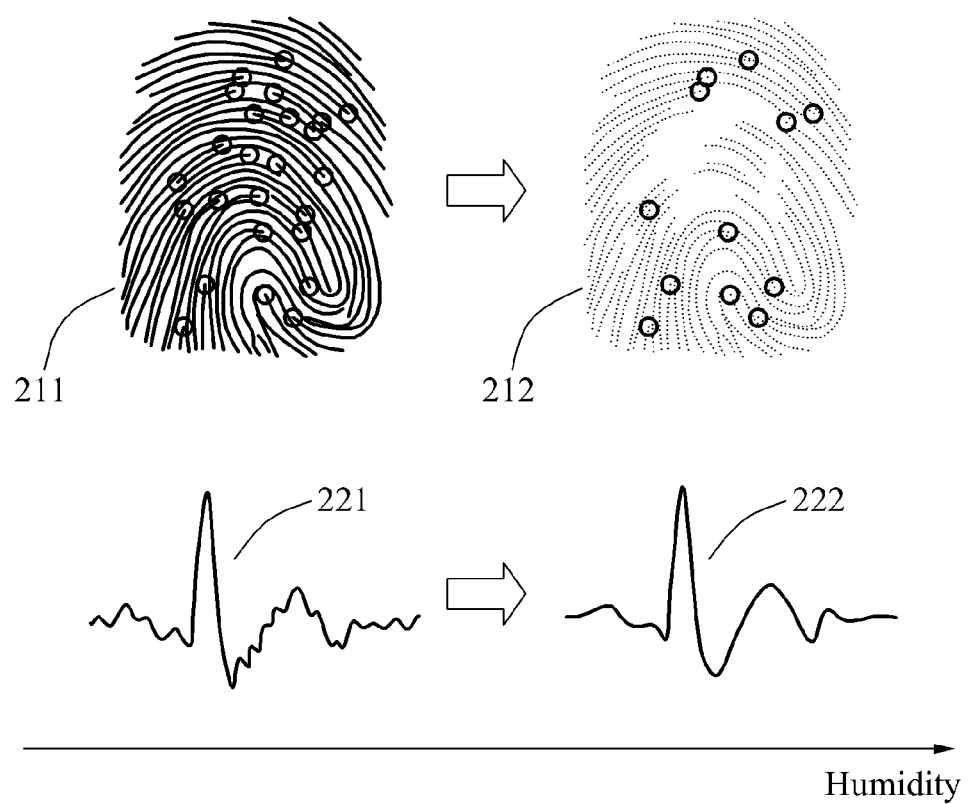
FIG. 2 is a diagram illustrating an example of qualities of fingerprint data and an electrocardiogram (ECG) waveform based on a humidity level.

FIG. 2 is a diagram illustrating an example of qualities of fingerprint data and an ECG waveform based on a humidity level. Referring to FIG. 2, qualities of fingerprint data and an ECG waveform acquired by an authentication apparatus vary based on a humidity level. In an example of FIG. 2, when a finger in contact with a fingerprint sensor has a low humidity level, for example, 10%, the authentication apparatus may extract 26 fingerprint feature points of fingerprint data as indicated by an image 211. Also, when the finger in contact with the fingerprint sensor has a high humidity level, for example, 80%, the authentication apparatus may extract 13 fingerprint feature points of fingerprint data, which is a half of a number of the fingerprint feature points extracted at the humidity level of 10%, as indicated by an image 212.

Also, in the example of FIG. 2, when the finger in contact with the fingerprint sensor has the low humidity level, for example, 10%, an SNR of an ECG signal may decrease, and thus, the authentication apparatus may acquire a low quality of an ECG waveform as indicated by a curve 221. Conversely, when the finger in contact with the fingerprint sensor has the high humidity level, for example, 80%, the SNR of the ECG signal may increase, and thus, the authentication apparatus may acquire a high quality of the ECG waveform as indicated by a curve 222. The foregoing example may be based on a case in which water on skin in contact with an ECG sensor causes an improvement in a flow of microcurrent between the skin and an electrode of the ECG sensor.

In consideration of the characteristics that the qualities of the fingerprint data and the ECG waveform vary based on the humidity level, the authentication apparatus may adaptively adjust a first similarity indicating a similarity between the fingerprint data of the user and reference fingerprint data, and a second similarity indicating a similarity between the ECG waveform of the user and a reference ECG waveform, based on the humidity level. Through this, the authentication apparatus may extract a combined similarity indicating whether the user matches a pre-registered user corresponding to the reference fingerprint data and the reference ECG waveform, and authenticate whether the user is the pre-registered user based on the combined similarity.

Figure 3:
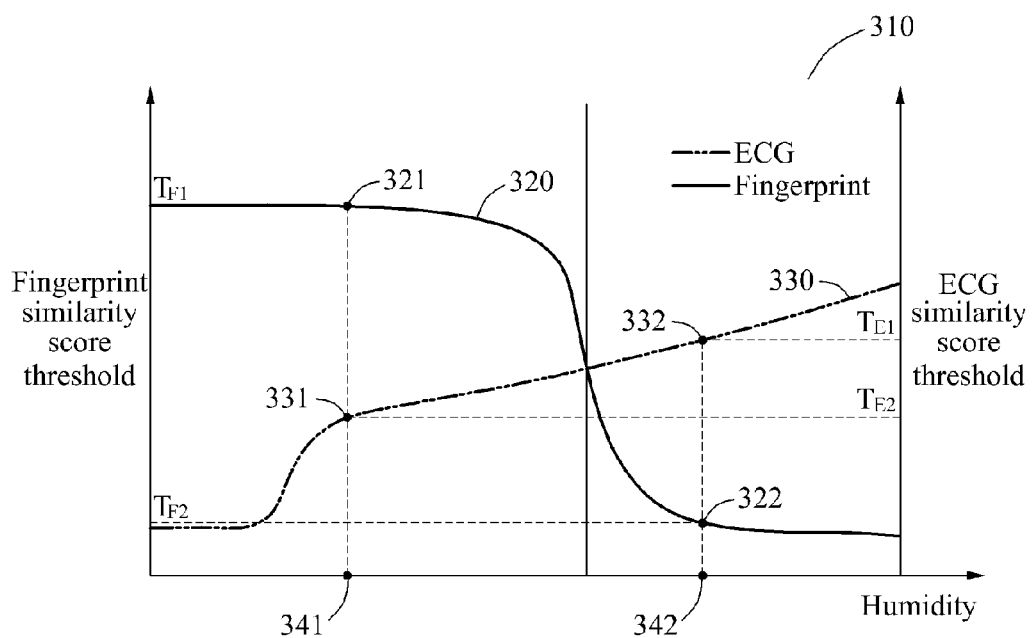
FIG. 3 is a diagram illustrating an example of thresholds of a first similarity and a second similarity based on a humidity level.

FIG. 3 is a diagram illustrating an example of thresholds of a first similarity and a second similarity based on a humidity level. Referring to FIG. 3, a graph 310 shows a first threshold, using a solid curve 320, and a second threshold, using a dash dot curve 330. The first threshold refers to the threshold of the first similarity, and the second threshold may refers the threshold of the second similarity. The first similarity refers to a similarity between reference fingerprint data and fingerprint data of a user attempting to be authenticated. The second similarity refers to a similarity between a reference ECG waveform and an ECG waveform of the user attempting to be authenticated. In the graph 310, a horizontal axis represents a humidity level, and vertical axes represent levels of the first threshold and the second threshold.

Qualities of the fingerprint data and the ECG waveform vary based on the humidity level. For example, the quality of the fingerprint data may decrease according to an increase in the humidity level, and the quality of the ECG waveform may increase according to the increase in the humidity level. Based on the characteristics of the fingerprint and the ECG waveform, the authentication apparatus may set the first threshold and the second threshold.

In an example, the authentication apparatus may acquire data on a difference among numbers of a plurality of fingerprint feature points based on the humidity level, or data on a difference in distances separating the plurality of fingerprint feature points, for each of a plurality of items of pre-stored fingerprint data in advance. Also, the authentication apparatus may calculate a minimum value from which the first similarity obtains reliability based on the humidity level by statistically analyzing the acquired data, and set the calculated minimum value as the first threshold.

Additionally, the authentication apparatus may calculate an SNR for each of a plurality of ECG signals based on the humidity level, and calculate a minimum value from which the second similarity obtains reliability based on the humidity level by statistically analyzing the calculated SNR, and setting the calculated minimum value as the second threshold.

In an example, the authentication apparatus may store data of the first threshold and the second threshold in advance, as shown in the graph 310. For example, the authentication apparatus may calculate the data of the first threshold and the second threshold, and store the calculated data in a lookup table. The authentication apparatus may also receive the lookup table or an entry value of the lookup table from an external source, using a communication interface. The authentication apparatus may set the first threshold and the second threshold based on the lookup table.

The authentication apparatus may extract a combined threshold by applying the first threshold, the second threshold, a first weighted value, and a second weighted value, to the first similarity and the second similarity, and authenticate the user based on the combined threshold.

In an example, the authentication apparatus may extract the combined threshold by using Equation 1. As an example, when a maximum humidity level is 100%, a minimum humidity level is 0%, and the combined threshold is 10, the humidity level may be 30% as indicated by a point 341, the first threshold may be 80 as indicated by a point 321 ($T_{F1}$), the second threshold may be 40 as indicated by a point 331 ($T_{E2}$), the first weighted value may be 0.8, and the second weighted value may be 0.2. In this example, when the first similarity is 90, and the second similarity is 30, a combined similarity may be extracted as 8. Since the combined similarity is less than the combined threshold, the authentication apparatus may authenticate the user as an unregistered user such that the user is disallowed to access a device including the authentication apparatus. As another example, under the same assumptions as the above example, the humidity level may be 70% as indicated by a point 342, the first threshold may be 20 as indicated by a point 322 ($T_{F2}$), the second threshold may be 60 as indicated by a point 332 ($T_{E1}$), the first weighted value may be 0.2, and the second weighted value may be 0.8. In this example, when the first similarity is 30, and the second similarity is 70, the combined similarity may be extracted as 10. Since the combined similarity is greater than or equal to the combined threshold, the authentication apparatus may authenticate the user as a pre-registered user such that the user is allowed to access the device including the authentication apparatus.

FIG. 4 is a diagram illustrating an example of a lookup table 410 including data based on a humidity level. Referring to FIG. 4, the lookup table 410 includes data of a first threshold 420, a second threshold 430, a first weighted value 440, and a second weighted value 450.

The first threshold 420 indicates a minimum value from which a first similarity obtains reliability, and the second threshold 430 indicates a minimum value from which a second similarity obtains reliability. The first similarity refers to a similarity between reference fingerprint data and fingerprint data of a user attempting to be authenticated, and the second similarity refers to a similarity between a reference ECG waveform and an ECG waveform of the user attempting to be authenticated. The first weighted value 440 indicates a ratio of the first similarity reflected in an extraction of a combined similarity indicating whether the user matches a pre-registered user. The second weighted value 450 indicates a ratio of the second similarity reflected in the extraction of the combined similarity.

The authentication apparatus may calculate the data of the first threshold 420, the second threshold 430, the first weighted value 440, and the second weighted value 450, and store the calculated data in the lookup table 410 in advance. The authentication apparatus may also receive the lookup table 410 or an entry value of the lookup table 410 from an external source by using a communication interface. The entry value may include a first threshold, a second threshold, a first weighted value, and a second weighted value for a respective humidity level. The authentication apparatus may set the first threshold 420, the second threshold 430, the first weighted value 440, and the second weighted value 450 based on the lookup table 410 or the entry value of the lookup table 410. As described above, the authentication apparatus may extract the first threshold 420, the second threshold 430, the first weighted value 440, and the second weighted value 450 without a need to perform a separate operation. Through this, a number of operations for authenticating the user may be reduced, and a speed of performing the operations may increase in the authentication apparatus.

Figure 5:
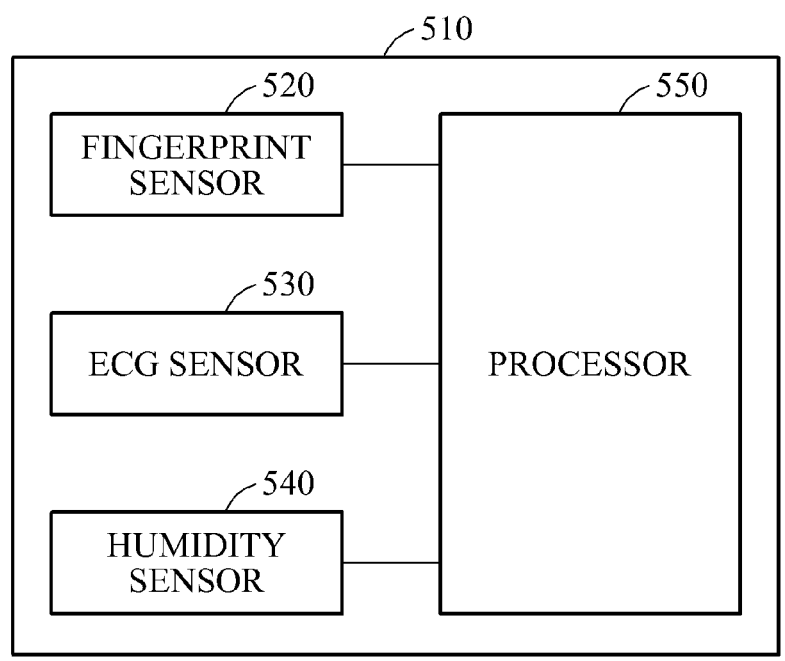
FIG. 5 is a block diagram illustrating another example of an authentication apparatus.

FIG. 5 is a block diagram illustrating another example of an authentication apparatus 510. Referring to FIG. 5, the authentication apparatus 510 includes a fingerprint sensor 520, an ECG sensor 530, a humidity sensor 540, and a processor 550.

The fingerprint sensor 520 senses fingerprint data of a user. In an example, the fingerprint sensor 520 may include an optical sensor, a semiconductor device-based sensor, an ultrasonic sensor, a heat detection-based sensor, a non-contact sensor, and/or a multiple-way sensor.

The ECG sensor 530 senses an ECG waveform of the user, using a first electrode, a second electrode, and a third electrode (not shown). In an example, the ECG sensor 530 may include the first electrode through the third electrode, an amplifier (not shown), and a digital converter (not shown).

The first electrode through the third electrode may be in contact with skin of the user to sense an ECG signal of the user. The amplifier may amplify the ECG signal sensed in the first electrode through the third electrode. In an example, the amplifier may be expressed by an AFE. The digital converter may convert the amplified ECG signal into a digital signal to extract the ECG waveform. Also, the ECG sensor 530 may remove noise from the ECG waveform through a preprocessing.

The humidity sensor 540 senses a humidity level of the skin of the user. In an example, the humidity sensor 540 may sense an amount of water evaporating from the skin of the user, and convert a result of the sensing into the humidity level.

In an example, the first electrode of the ECG sensor, the fingerprint sensor 520, and the humidity sensor 540 may be disposed in a predetermined area of the authentication apparatus 510. Through this, the ECG sensor 530, the fingerprint sensor 520, and the humidity sensor 540 may sense a single finger of the user, and acquire the ECG waveform, the fingerprint data, and the humidity level, respectively.

The processor 550 adaptively adjusts a first similarity between the fingerprint data acquired by the fingerprint sensor 520 and reference fingerprint data, and a second similarity between the ECG waveform acquired by the ECG sensor 530 and a reference ECG waveform, based on the humidity level. Through this, the processor 550 extracts a combined similarity indicating whether the user sensed by the fingerprint sensor 520 and the ECG sensor 530 matches a pre-registered user corresponding to the reference fingerprint data and the reference ECG waveform. The processor 550 may extract a plurality of fingerprint feature points of the fingerprint data acquired by the fingerprint sensor 520, and extract the first similarity by determining whether the plurality of fingerprint feature points of the fingerprint data acquired by the fingerprint sensor 520 matches a plurality of fingerprint feature points of the reference fingerprint data. Also, the processor 550 may extract a plurality of ECG feature points of the ECG waveform acquired by the ECG sensor 530, and extract the second similarity based on distances between the plurality of ECG feature points of the ECG waveform acquired by the ECG sensor 530 and a plurality of ECG feature points of the reference ECG waveform.

The processor 550 may extract a first threshold indicating a minimum value from which the first similarity obtains reliability and a second threshold indicating a minimum value from which the second similarity obtains the reliability from predetermined reference data. Alternatively, the processor 550 may set the first threshold and the second threshold in consideration of a relationship between the humidity level and a quality of a plurality of items of pre-stored fingerprint data, and a relationship between the humidity level and a quality of a plurality of pre-stored ECG waveforms. Also, the processor 550 may set the first threshold and the second threshold such that the first weighted value has a negative relationship with the humidity level, the second weighted value has a positive relationship with the humidity level, and a sum of the first weighted value and the second weighted value is maintained to be constant.

The processor 550 may extract the combined similarity by applying the first threshold and the second threshold determined based on the humidity level, to the first similarity and the second similarity. Also, the processor 550 may extract the combined similarity by applying the first weighted value, the second weighted value, the first threshold, and the second threshold, to the first similarity and the second similarity. For example, the processor 550 may extract the combined similarity by applying the first weighted value to a difference value between the first similarity and the first threshold, and applying the second weighted value to a difference value between the second similarity and the second threshold.

The processor 550 authenticates whether the user is the pre-registered user based on the combined similarity. For example, the processor 550 may authenticate the user as the pre-registered user when the combined similarity is greater than a predetermined combined threshold, and authenticate the user as an unregistered user when the combined similarity is less than or equal to the predetermined combined threshold.

Figure 6:
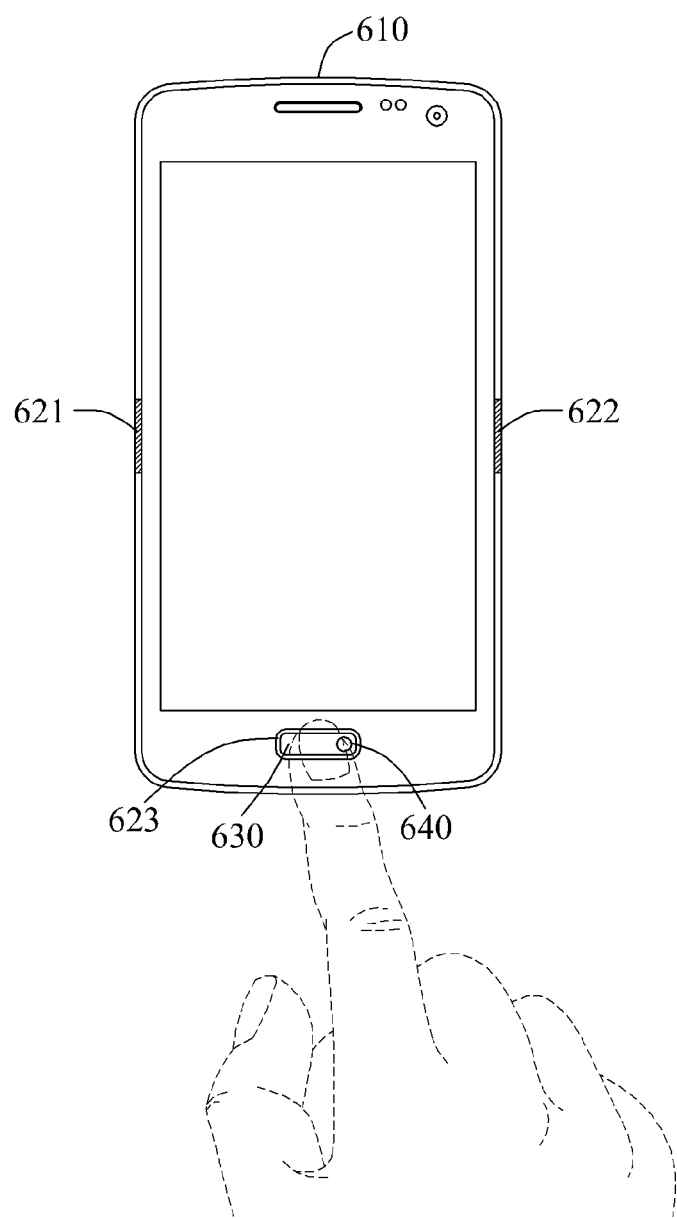
FIG. 6 is a diagram illustrating an example of an authentication apparatus.

FIG. 6 is a diagram illustrating an example of an authentication apparatus. Referring to FIG. 6, a mobile terminal 610 includes an ECG sensor, a fingerprint sensor 630, and a humidity sensor 640. The ECG sensor includes a positive pole electrode 621, a reference electrode 622, and a negative pole electrode 623, to sense an ECG signal. In this example, the positive pole electrode 621 and the reference electrode 622 are disposed on respective sides of the mobile terminal 610, and the negative pole electrode 623, the fingerprint sensor 630, and the humidity sensor 640 are disposed on a lower portion of the mobile terminal 610.

When skin of a user is in contact with the positive pole electrode 621 and the reference electrode 622, and a finger of the user is in contact with the negative pole electrode 623, the fingerprint sensor 630, and the humidity sensor 640, the fingerprint sensor 630, the ECG sensor, and the humidity sensor 640 sense fingerprint data, an ECG waveform, and a humidity level, respectively, of the user. In this example, the fingerprint sensor 630, the ECG sensor, and the humidity sensor 640 sense the fingerprint data, the ECG waveform, and the humidity level, respectively, from a single finger of the user.

The mobile terminal 610 adaptively adjusts a first similarity between the fingerprint data acquired by the fingerprint sensor 630 and reference fingerprint data, and a second similarity between the ECG waveform acquired by the ECG sensor and a reference ECG waveform, based on the humidity level. Through this, the mobile terminal 610 extracts a combined similarity indicating whether the user sensed by the fingerprint sensor 630 and the ECG sensor matches a pre-registered user corresponding to the reference fingerprint data and the reference ECG waveform. The mobile terminal 610 may extract the combined similarity by applying a first weighted value to a difference value between the first similarity and a first threshold, and applying a second weighted value to a difference value between the second similarity and a second threshold. In this example, the mobile terminal 610 may extract the first threshold, the second threshold, the first weighted value, and the second weighted value from predetermined reference data. Alternatively, the mobile terminal may set the first threshold, the second threshold, the first weighted value, and the second weighted value in consideration of a relationship between the humidity level and a quality of a plurality of items of pre-stored fingerprint data, and a relationship between the humidity level and a quality of a plurality of pre-stored ECG waveforms.

The mobile terminal 610 authenticates whether the user is the pre-registered user based on the combined similarity. For example, when the combined similarity is greater than a predetermined combined threshold, the mobile terminal 610 may authenticate the user as the pre-registered user to allow the user to access the mobile terminal 610.

Figure 7:
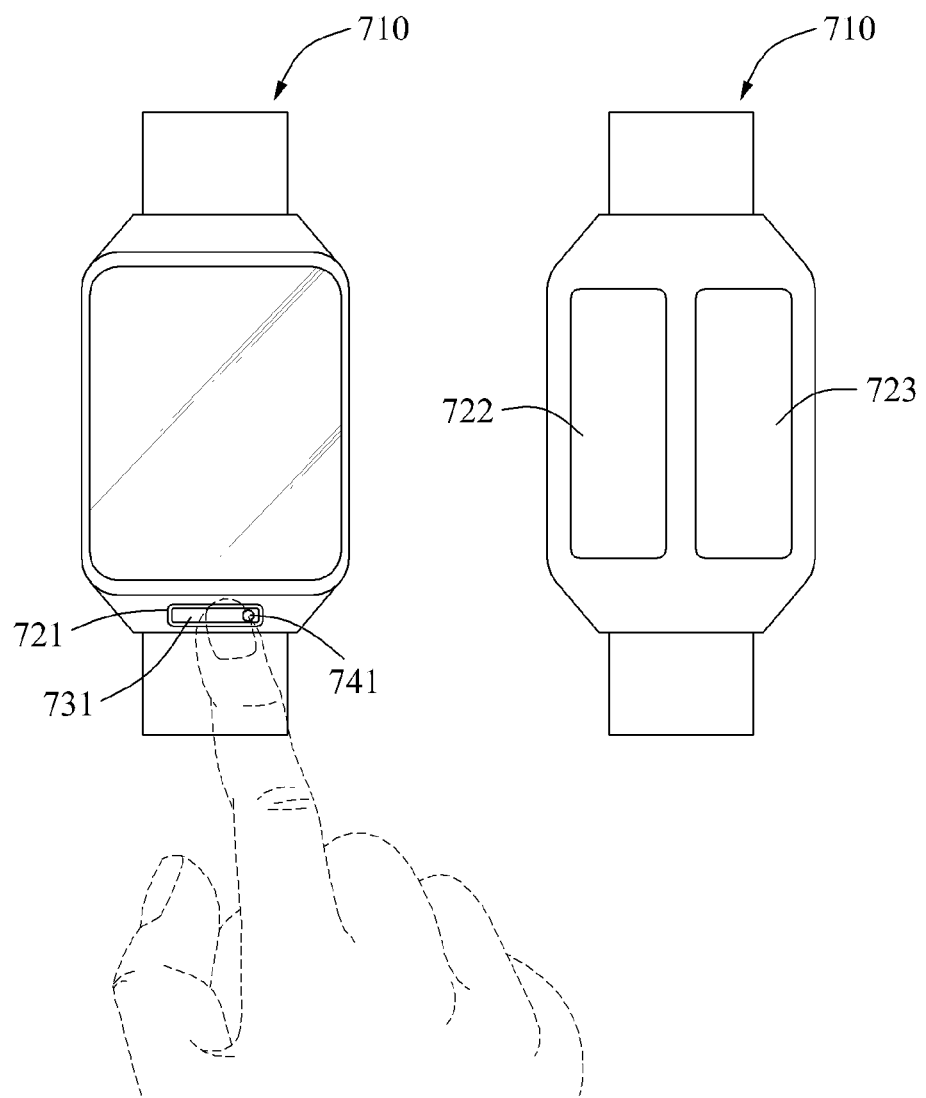
FIG. 7 is a diagram illustrating another example of an authentication apparatus.

FIG. 7 is a diagram illustrating another example of an authentication apparatus. Referring to FIG. 7, a wearable terminal 710 includes an ECG sensor, a fingerprint sensor 731, and a humidity sensor 741.

The ECG sensor includes a positive pole electrode 722, a reference electrode 723, and a negative pole electrode 721, to sense an ECG signal. In this example, the positive pole electrode 722 and the reference electrode 723 are disposed on a rear side of the wearable terminal 710, and the negative pole electrode 721, the fingerprint sensor 731, and the humidity sensor 741 are disposed on a front side of the wearable terminal 710. When wrist skin of a user is in contact with the positive pole electrode 722 and the reference electrode 723, and a finger of the user is in contact with the negative pole electrode 721, the fingerprint sensor 731, and the humidity sensor 741, the fingerprint sensor 731, the ECG sensor, and the humidity sensor 741 sense fingerprint data, an ECG waveform, and a humidity level, respectively, of the user. In this example, the fingerprint sensor 731, the ECG sensor, and the humidity sensor 741 sense the fingerprint data, the ECG waveform, and the humidity level, respectively, from a single finger of the user.

Similarly to the mobile terminal 610 of FIG. 6, the wearable terminal 710 adaptively adjusts a first similarity between the fingerprint data acquired by the fingerprint sensor 731 and reference fingerprint data, and a second similarity between the ECG waveform acquired by the ECG sensor and a reference ECG waveform, based on the humidity level. Through this, the wearable terminal 710 extracts a combined similarity indicating whether the user matches a pre-registered user corresponding to the reference fingerprint data and the reference ECG waveform, and authenticates whether the user is the pre-registered user based on the combined similarity.

Figure 8:
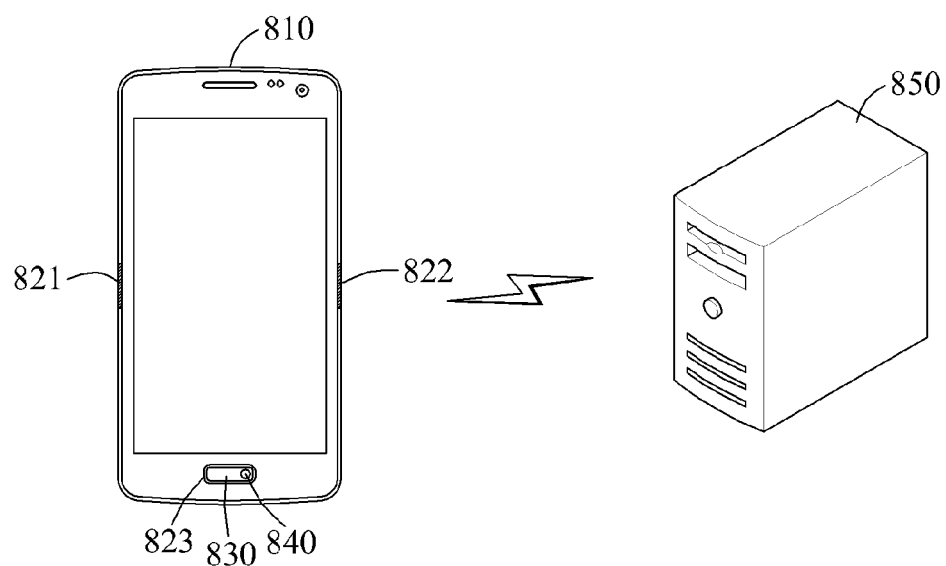
FIG. 8 is a diagram illustrating still another example of an authentication apparatus.

FIG. 8 is a diagram illustrating still another example of an authentication apparatus. Referring to FIG. 8, a mobile terminal 810 includes an ECG sensor, a fingerprint sensor 830, and a humidity sensor 840. The ECG sensor includes a positive pole electrode 821, a reference electrode 822, and a negative pole electrode 823, to sense an ECG signal. In this example, the positive pole electrode 821 and the reference electrode 822 are disposed on respective sides of the mobile terminal 810, and the negative pole electrode 823, the fingerprint sensor 830, and the humidity sensor 840 are disposed on a lower portion of the mobile terminal 810.

The mobile terminal 810 acquires reference fingerprint data indicating fingerprint data of a pre-registered user and data of a reference ECG waveform indicating an ECG waveform of the pre-registered user, from a server 850. The mobile terminal 810 may extract a combined similarity indicating whether the user matches the pre-registered user by applying a first threshold, a second threshold, a first weighted value, and a second weighted value determined based on the humidity level, to a first similarity indicating a similarity between the fingerprint data acquired by the fingerprint sensor 830 and the reference fingerprint data, and a second similarity indicating a similarity between the ECG waveform acquired by the ECG sensor and the reference ECG waveform.

In an example, the mobile terminal 810 may transmit the humidity level acquired by the humidity sensor 840 to the server 850. The server 850 may extract, from predetermined reference data, the first threshold, the second threshold, the first weighted value, and the second weighted value for the humidity level received from the mobile terminal 810. Alternatively, the server 850 may set the first threshold, the second threshold, the first weighted value, and the second weighted value in consideration of a relationship between the humidity level and a quality of a plurality of items of pre-stored fingerprint data, and a relationship between the humidity level and a quality of a plurality of pre-stored ECG waveforms. Through this, the server 850 may transmit the first threshold, the second threshold, the first weighted value, and the second weighted value to the mobile terminal 810. The mobile terminal 810 may extract the combined similarity by applying the first threshold, the second threshold, the first weighted value, and the second weighted value received from the server 850, to the first similarity and the second similarity.

The mobile terminal 810 authenticates whether the user is the pre-registered user based on the combined similarity. For example, when the combined similarity is greater than a predetermined combined threshold, the mobile terminal 810 may authenticate the user as the pre-registered user, and transmit authentication data indicating that the user is the pre-registered user, to the server 850.

In an example, the server 850 may transmit the lookup table 410 of FIG. 4 to the mobile terminal 810, or transmit an entry value of the lookup table 410 to the mobile terminal 810. The entry value may include the first threshold, the second threshold, the first weighted value, and the second weighted value for a respective humidity level. In this example, the mobile terminal 810 may extract the first similarity, the second similarity, the first weighted value, and the second weighted value from the predetermined reference data based on the humidity level acquired by the humidity sensor 840 by using the lookup table 410 or the entry value of the lookup table 410. The mobile terminal 810 may extract the combined similarity by applying the first similarity, the second similarity, the first weighted value, and the second weighted value extracted from the predetermined reference data. The server 850 may allow the user to access the server 850 based on the received authentication data.

Figure 9:
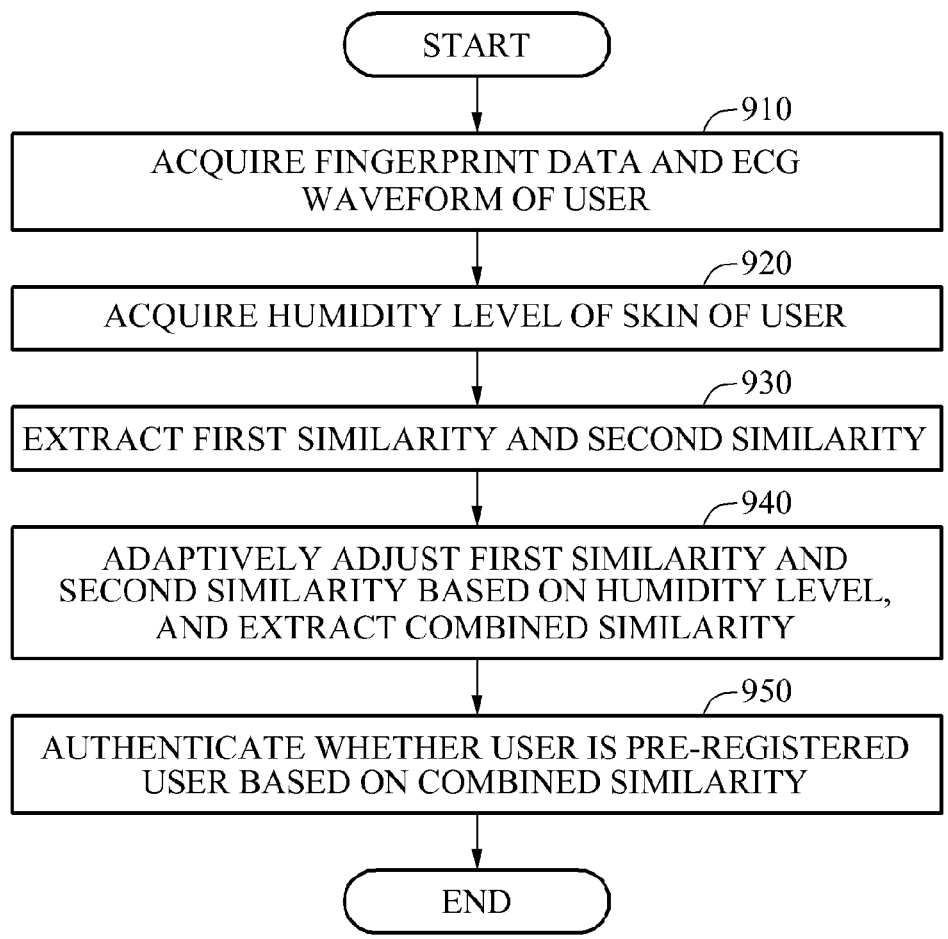
FIG. 9 is a flowchart illustrating an example of an authentication method.

FIG. 9 is a flowchart illustrating an example of an authentication method. Referring to FIG. 9, in operation 910, an authentication apparatus acquires fingerprint data and an ECG waveform of a user.

In operation 920, the authentication apparatus acquires a humidity level of skin of the user.

In operation 930, the authentication apparatus extracts a first similarity between the fingerprint data and reference fingerprint data and a second similarity between the ECG waveform and a reference ECG waveform.

In operation 940, the authentication apparatus adaptively adjusts the first similarity and the second similarity based on the humidity level, and extracts a combined similarity indicating whether the user matches a pre-registered user corresponding to the reference fingerprint data and the reference ECG waveform.

In operation 950, the authentication apparatus authenticates whether the user is the pre-registered user based on the combined similarity.

Repeated descriptions with respect to the authentication method of FIG. 9 will be omitted for increased clarity and conciseness because the descriptions provided with reference to FIGS. 1 through 8 are also applicable to the authentication method of FIG. 9.

Figure 10:
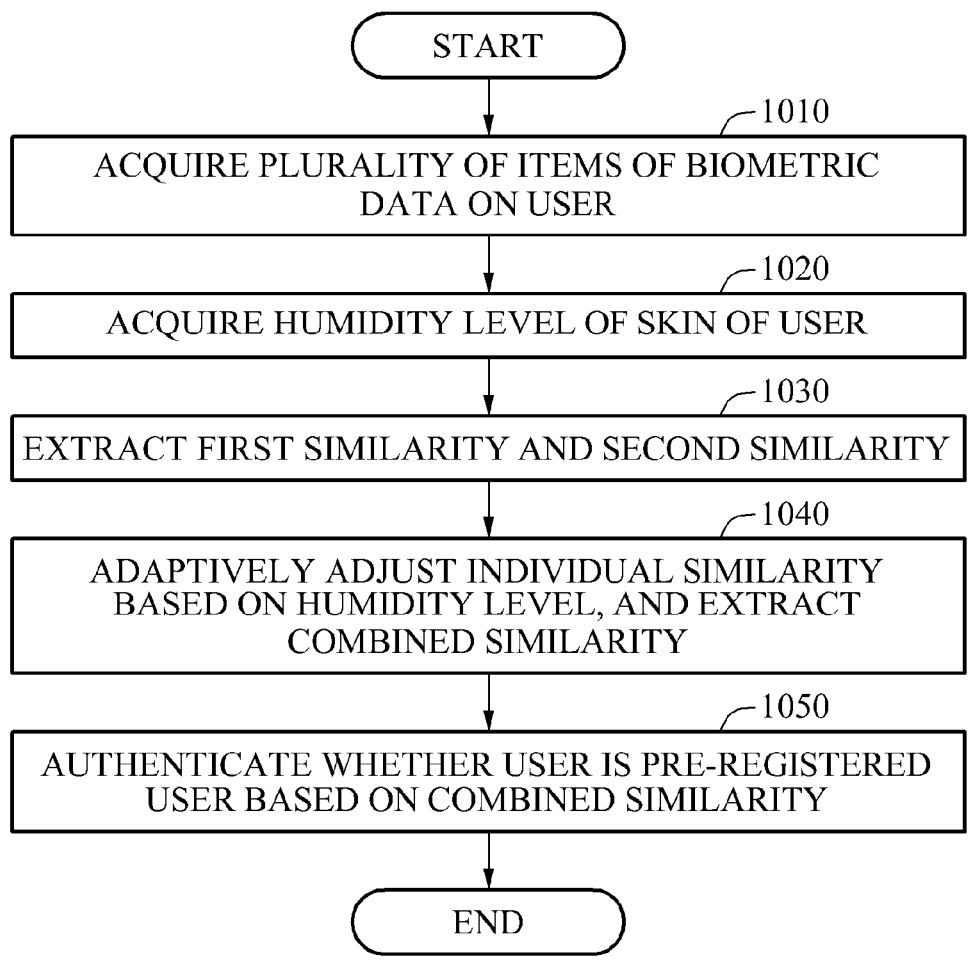
FIG. 10 is a flowchart illustrating another example of an authentication method.

FIG. 10 is a flowchart illustrating another example of an authentication method. Referring to FIG. 10, in operation 1010, an authentication apparatus acquires a plurality of items of biometric data on a user.

In operation 1020, the authentication apparatus acquires a humidity level of skin of the user.

In operation 1030, the authentication apparatus extracts an individual similarity for each item of the biometric data. The individual similarity may indicate a similarity between each item of the biometric data and reference biometric data corresponding to each item of the biometric data among a plurality of items of reference biometric data.

In operation 1040, the authentication apparatus adaptively adjusts the individual similarity of each item of biometric data based on the humidity level, and extracts a combined similarity indicating whether the user matches a pre-registered user corresponding to the plurality of items of reference biometric data.

In operation 1050, the authentication apparatus authenticates whether the user is the pre-registered user based on the combined similarity.

Repeated descriptions with respect to the authentication method of FIG. 10 will be omitted for increased clarity and conciseness because the descriptions provided with reference to FIGS. 1 through 8 are also applicable to the authentication method of FIG. 10.

The various elements and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

As a non-exhaustive illustration only, a terminal or device described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blue-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An authentication apparatus comprising:
a memory configured to store instructions, and
a processing device configured to execute the stored instructions such that the processing device is configured to
adjust a first similarity between an acquired fingerprint data and reference fingerprint data of a pre-registered user, and a second similarity between an acquired ECG waveform and a reference ECG waveform of the pre-registered user, based on an acquired humidity level,
extract a combined similarity based on the adjusted first similarity and the adjusted second similarity; and
authenticate whether the user is the pre-registered user based on the combined similarity.

2. The apparatus of claim 1, wherein the fingerprint data, the ECG waveform, and the humidity level are acquired from an identical finger of the user.

3. The apparatus of claim 1, wherein the processing device is further configured to
acquire the fingerprint data, using a fingerprint sensor,
extract fingerprint feature points from the acquired fingerprint data,
acquire the ECG waveform, using an ECG sensor, and
extract ECG feature points from the acquired ECG waveform.

4. The apparatus of claim 3, wherein the ECG sensor comprises:
electrodes configured to acquire an ECG signal of the user;
an amplifier configured to amplify the ECG signal; and
a digital converter configured to convert the amplified ECG signal to the ECG waveform.

5. The apparatus of claim 2, wherein the processing device is further configured to:
extract the combined similarity based on a difference value between the first similarity and a first threshold determined based on the humidity level, and a difference value between the second similarity and a second threshold determined based on the humidity level.

6. The apparatus of claim 5, wherein the processing device is further configured to:
extract the first threshold and the second threshold from predetermined data.

7. The apparatus of claim 5, wherein the processing device is further configured to:
extract the first threshold based on a difference in a number of fingerprint feature points corresponding to each of items of pre-stored fingerprint data based on the humidity level, or a difference in a distance separating the fingerprint feature points corresponding to each of the items of the pre-stored fingerprint data.

8. The apparatus of claim 5, wherein the processing device is further configured to:
calculate a signal-to-noise ratio (SNR) of each of pre-stored ECG signals based on the humidity level; and
extract the second threshold based on the SNR.

9. The apparatus of claim 5, wherein the processing device is further configured to:
extract the combined similarity by applying a first weighted value determined based on the humidity level to the difference value between the first similarity and the first threshold, and applying a second weighted value determined based on the humidity level to the difference value between the second similarity and the second threshold.

10. The apparatus of claim 9, wherein the processing device is further configured to:
extract the combined similarity by adding the difference value to which the first weighted value is applied, to the difference value to which the second weighted value is applied.

11. The apparatus of claim 9, wherein the processing device is further configured to:
set the first weighted value and the second weighted value such that the first weighted value has a negative relationship with the humidity level, the second weighted value has a positive relationship with the humidity level, and a sum of the first weighted value and the second weighted value is constant irrespective of the humidity level.

12. The apparatus of claim 3, wherein the fingerprint feature points comprises at least two of a ridge, an upper center point, a lower center point, a left delta, a right delta, a bifurcation, and an ending point of the fingerprint data.

13. The apparatus of claim 3, wherein the ECG feature points comprises at least two of a PR segment, a QRX complex, an ST segment, a T wave, a U wave, a PR interval, and a QT interval of the ECG waveform.

14. The apparatus of claim 1, wherein the processing device is further configured to:
authenticate the user as the pre-registered user in response to the combined similarity being greater than a predetermined value.

15. An authentication apparatus comprising:
a fingerprint sensor configured to sense fingerprint data of a user;
an electrocardiogram (ECG) sensor configured to sense an ECG waveform of the user based on a first electrode, a second electrode, and a third electrode;
a humidity sensor configured to sense a humidity level of skin of the user; and
a processing device configured to
adjust, based on the humidity level, a first similarity between the fingerprint data and reference fingerprint data of a pre-registered user, and a second similarity between the ECG waveform and a reference ECG waveform of the pre-registered user,
extract a combined similarity based on the adjusted first similarity and the adjusted second similarity, and
authenticate whether the user is the pre-registered user based on the combined similarity.

16. The apparatus of claim 15, wherein the first electrode, the fingerprint sensor, and the humidity sensor are disposed in a predetermined area.

17. The apparatus of claim 15, wherein the first electrode, the fingerprint sensor, and the humidity sensor are configured to sense an identical finger of the user.

18. The apparatus of claim 15, wherein the processing device is configured to:
extract the combined similarity based on a difference value between the first similarity and a first threshold determined based on the humidity level, and a difference value between the second similarity and a second threshold determined based on the humidity level.

19. The apparatus of claim 18, wherein the processing device is configured to:
extract the combined similarity by applying a first weighted value determined based on the humidity level to the difference value between the first similarity and the first threshold, and applying a second weighted value determined based on the humidity level to the difference value between the second similarity and the second threshold.

20. The apparatus of claim 19, wherein the processing device is configured to:
extract the combined similarity by adding the difference value to which the first weighted value is applied, to the difference value to which the second weighted value is applied.

21. An authentication apparatus comprising:
a biometric data sensor configured to acquire first biometric data of a user and second biometric data of the user, wherein the first and second biometric data vary based on humidity level;
a humidity level sensor configured to acquire a humidity level of skin of the user;
a processing device configured to
adjust, based on the acquired humidity level, a first similarity between the first biometric data and respective first reference biometric data of a pre-registered user, and a second similarity between the second biometric data and respective second reference biometric data of the pre-registered user;
extract a combined similarity based on the adjusted first similarity and the adjusted second similarity; and
authenticate whether the user is the pre-registered user based on the combined similarity.

22. An authentication method comprising:
acquiring fingerprint data and an electrocardiogram (ECG) waveform of a user;
acquiring a humidity level of skin of the user;
adjusting a first similarity between the fingerprint data and reference fingerprint data of a pre-registered user, and a second similarity between the ECG waveform and a reference ECG waveform of the pre-registered user, based on the humidity level;
extracting a combined similarity based on the adjusted first similarity and the adjusted second similarity; and
authenticating whether the user is the pre-registered user based on the combined similarity.

23. An authentication method comprising:
acquiring first biometric data of a user and second biometric data of the user, wherein the first and second biometric data vary based on humidity level;
acquiring a humidity level of skin of the user;
adjusting, based on the acquired humidity level, a first similarity between the first biometric data and respective first reference biometric data of a pre-registered user, and a second similarity between the second biometric data and respective second reference biometric data of the pre-registered user;
extracting a combined similarity based on the adjusted first similarity and the adjusted second similarity; and
authenticating whether the user is the pre-registered user based on the combined similarity.

24. An authentication apparatus comprising:
a processing device configured to
adjust, based on a humidity level of skin of a user, a first similarity between first biometric data of the user and first reference biometric data of a pre-registered user, and a second similarity between second biometric data of the user and second reference biometric data of the pre-registered user, wherein the first and second biometric data may vary based on humidity level,
extract a combined similarity based on the adjusted first similarity and the adjusted second similarity, and
authenticate whether the user is the pre-registered user based on the combined similarity.

25. The apparatus of claim 24, wherein the processing device is configured to:
increase the first similarity, and decrease the second similarity, in response to the humidity level increasing; and
decrease the first similarity, and increase the second similarity, in response to the humidity level decreasing.

26. The apparatus of claim 24, wherein:
a quality of the first biometric data decreases in response to the humidity level increasing; and
a quality of the second biometric data increases in response to the humidity level increasing.

* * * * *